United States Patent
Kuschel et al.

(10) Patent No.: US 11,094,484 B2
(45) Date of Patent: Aug. 17, 2021

(54) INSULATING MEDIUM FOR AN ELECTRIC ENERGY TRANSMISSION DEVICE

(71) Applicant: SIEMENS AKTIENGESELLSCHAFT, Munich (DE)

(72) Inventors: Mark Kuschel, Berlin (DE); Bernhard Lutz, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/764,931

(22) PCT Filed: Oct. 31, 2018

(86) PCT No.: PCT/EP2018/079778
§ 371 (c)(1),
(2) Date: May 18, 2020

(87) PCT Pub. No.: WO2019/096581
PCT Pub. Date: May 23, 2019

(65) Prior Publication Data
US 2020/0294742 A1  Sep. 17, 2020

(30) Foreign Application Priority Data
Nov. 17, 2017 (DE) .............................. 102017220570

(51) Int. Cl.
*H01H 33/22* (2006.01)
*H02B 13/035* (2006.01)
*H02B 13/055* (2006.01)

(52) U.S. Cl.
CPC ......... *H01H 33/22* (2013.01); *H02B 13/0354* (2013.01); *H02B 13/055* (2013.01)

(58) Field of Classification Search
CPC .. H01H 33/22; H01H 33/32; H01H 2033/566; H02B 13/0354; H02B 13/055; H02B 13/0655; H01B 3/56
USPC ........... 218/85, 91, 97, 100, 80, 79; 252/571
See application file for complete search history.

(56) References Cited

U.S. PATENT DOCUMENTS

| | | | | |
|---|---|---|---|---|
| 3,467,760 A | * | 9/1969 | Litty | H01B 17/36 174/17 R |
| 3,646,284 A | * | 2/1972 | Bokshorn | H02B 13/035 200/48 R |
| 7,091,439 B2 | * | 8/2006 | Vaghini | H01H 33/6661 218/154 |

(Continued)

FOREIGN PATENT DOCUMENTS

| DE | 4430579 B4 | 3/2005 |
|---|---|---|
| DE | 20 2009 018 213 U1 | 6/2011 |

(Continued)

*Primary Examiner* — William A Bolton
(74) *Attorney, Agent, or Firm* — Laurence Greenberg; Werner Stemer; Ralph Locher

(57) ABSTRACT

An insulating medium for an electric energy transmission device is a fluid at room temperature and atmospheric pressure and has at least the following components ≥50% by volume to ≤98% by volume of synthetic air, and ≥2% by volume to ≤50% by volume of an organic fluorine compound. An electric arc extinguishing medium and a fluid-insulated electric energy transmission device are also provided.

10 Claims, 1 Drawing Sheet

(56) References Cited

U.S. PATENT DOCUMENTS

| | | | |
|---|---|---|---|
| 7,193,172 B2* | 3/2007 | Rokunohe | H01H 33/22 218/43 |
| 8,822,870 B2* | 9/2014 | Mantilla | H01B 3/56 218/157 |
| 9,928,973 B2 | 3/2018 | Claessens et al. | |
| 10,505,349 B2 | 12/2019 | Di-Gianni et al. | |
| 2013/0221292 A1* | 8/2013 | Ingold | H02B 7/00 252/571 |
| 2014/0175341 A1* | 6/2014 | Claessens | H02B 13/055 252/571 |
| 2014/0233159 A1* | 8/2014 | Kieffel | H02B 13/055 361/600 |

FOREIGN PATENT DOCUMENTS

| | | |
|---|---|---|
| DE | 11 2009 004905 T5 | 6/2012 |
| DE | 20 2016 100268 U1 | 2/2016 |
| WO | WO 2015/071303 A1 | 5/2015 |

* cited by examiner

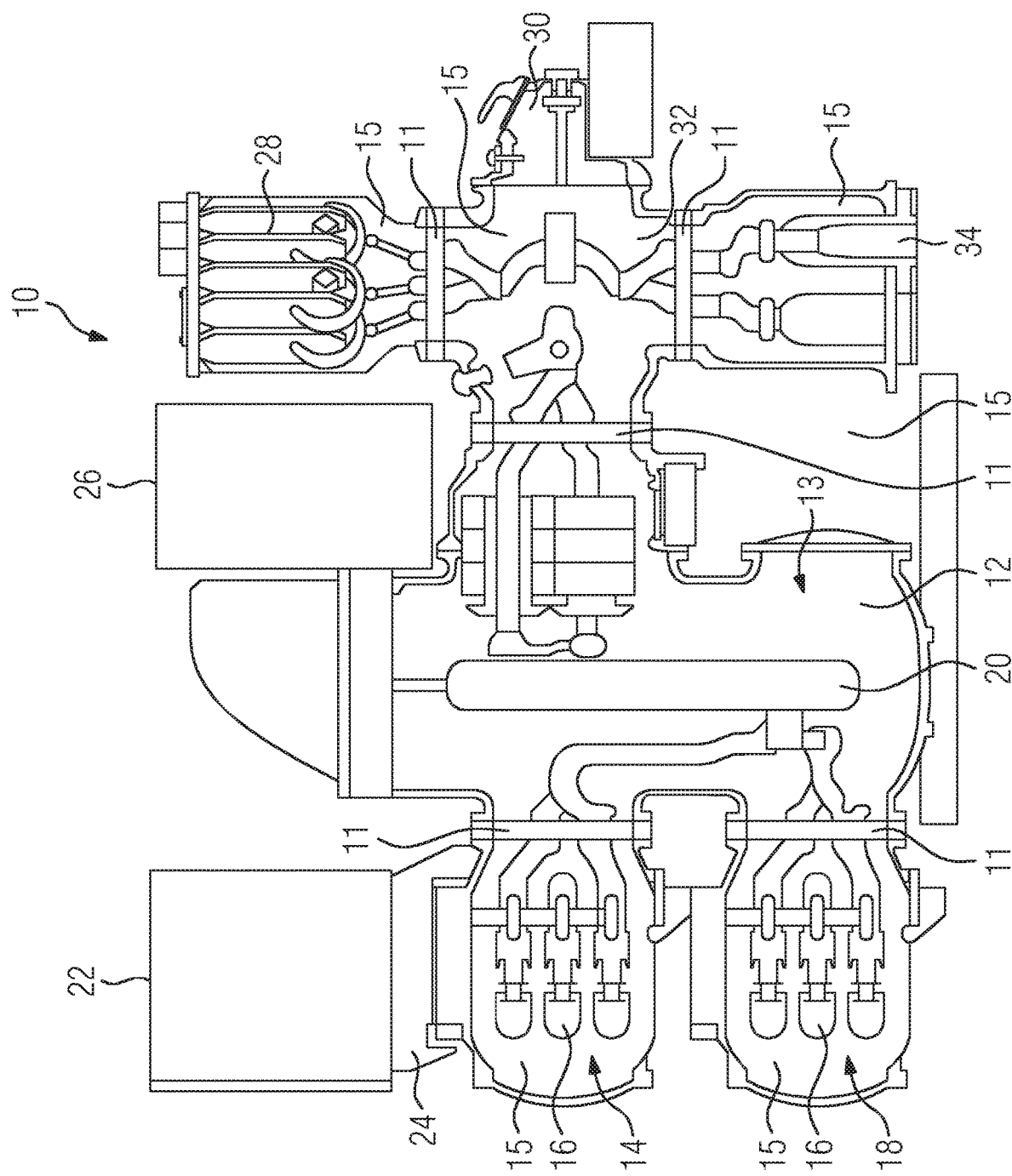

INSULATING MEDIUM FOR AN ELECTRIC ENERGY TRANSMISSION DEVICE

BACKGROUND OF THE INVENTION

Field of the Invention

The invention relates to an insulating medium for an electric energy transmission device, for instance for a high-voltage switch or a fluid-insulated tube conductor, wherein the insulating medium is a fluid at room temperature and atmospheric pressure. The invention further relates to an electric energy transmission device which comprises such an insulating medium.

Electric energy transmission devices, for instance high-voltage switches or power switches, are widely known in the field. They serve to break high currents. It is usual to provide contact elements which can be brought into contact in order to allow an electric connection and can be parted in order to be able to break an electric connection or an electric current.

An arc can be formed on parting of the contact elements. Arcs can stress the material of the contact elements and thus lead to damage to the latter.

In order to prevent this, arranging the contact elements in an insulating medium is known. This can, for example, be gaseous and fill an insulation space in which the contact elements are arranged.

For example, DE 44 305 79 B4 relates to a high-voltage switch having a main switching contact and an auxiliary switching device which bridges the main switching contact during the switching-on operation shortly before reaching its switched-on state with insertion of a switching-on resistance and the parting of the contacts of which during switching-off occurs before parting of the main switching contact, with the movement of the auxiliary switching device being slowed, at least during the switching-off operation, by a fluid which is moved in a first piston/cylinder arrangement connected to a first contact piece of the auxiliary switching device. Sulfur hexafluoride is described as insulating medium in this document.

Such solutions known from the prior art can offer further improvement potential, in particular in respect of a possible long-term stability of the contact elements and of the insulating medium itself.

SUMMARY OF THE INVENTION

It is an object of the present invention to overcome the disadvantages known from the prior art at least partly. It is, in particular, an object of the present invention to provide a solution by means of which the long-term stability of high-voltage switches can be improved.

The object is achieved according to the invention by an insulating medium for an electric energy transmission device. Furthermore, the object is achieved according to the invention by use of an insulating medium as electric arc extinguishing medium in a high-voltage switch or as insulating atmosphere in a tube conductor. The object is also achieved according to the invention by an electric energy transmission device. Preferred embodiments of the invention are described in the dependent claims, in the description or in the figures, with further features described or shown in the dependent claims or in the description or in the figures being able, individually or in any combination, to be subject matter of the invention, unless the contrary is unambiguously apparent from the context.

An insulating medium for an electric energy transmission device is proposed, wherein the insulating medium is a fluid at room temperature and atmospheric pressure and the insulating medium comprises at least the following constituents:

synthetic air in a proportion of from ≥50% by volume to ≤98% by volume; and
an organic fluorine compound in a proportion of from ≥2% by volume to ≤50% by volume.

An illustrative mixing ratio for a mixture of synthetic air and fluorine compound or fluorine compounds is 95% by volume of synthetic air and 5% by volume of organic fluorine compound, in particular fluoronitriles.

A previously described insulating medium allows reliable reduction or extinguishing of an electric arc in a high-voltage switch and allows stable operation of the high-voltage switch over the long term and is also particularly advantageous as insulating atmosphere in a fluid-insulated tube conductor.

The insulating medium described here is, in particular, suitable for use in an electric energy transmission device. As such, it is possible to use, for example, a high-voltage switch or a fluid-insulated tube conductor. For the purposes of the present invention, a high-voltage switch is, in particular, a switching device which comprises an electric conductor which can be opened or closed by means of appropriate contact elements and can thus allow or interrupt a flow of current. The high-voltage switch can be suitable for conducting high currents or the presence of a high voltage, with electric arcs being able to occur on parting.

Illustrative currents which can be parted by a power switch of a high-voltage switch can be in the range of up to 80 000 A. Furthermore, the switching device can be subjected to voltages in the range of up to 800 000 V.

Furthermore, a fluid-insulated tube conductor can be taken to mean, in particular, a conductor in which usual operating voltages of up to about 500 kV together with nominal currents per conductor up to about 5 kA can be present. Here, the conductor can be present in an outer tube, with an insulating atmosphere being present in the outer tube and surrounding the conductor and supporting insulators being able to be present to provide mechanical support for the conductor.

In particular, the insulating medium should serve to extinguish an electric arc which occurs in the high-voltage switch and can occur, in particular, on parting of contact elements or to be able to ensure sufficient insulation in the tube conductor.

In order to bring this about, the insulation medium is for the purposes of the invention a fluid, for example gaseous, at room temperature and atmospheric pressure, for instance in a range from atmospheric pressure to 10 bar (absolute). For the purposes of the present invention, room temperature is a temperature of 22° C., while atmospheric pressure is a pressure of 1 bar and pressures mentioned should fundamentally be taken to be absolute values. The insulating medium can preferably also be a fluid, for example gaseous, under the operating conditions, i.e. for instance under an increased pressure and/or an increased or reduced temperature, as is described below.

The provision of a fluid insulating medium makes it possible, in a particularly simple way, for the insulating medium to be introduced into an insulation space of the high-voltage switch and remain there. In this way, the insulating medium can completely surround contact elements between which an electric arc can arise on parting or else a conductor in a tube conductor. Thus, the formation of an electric arc can in principle be countered or extinguishing of the electric arc can be effectively assisted or effective insulation of the conductor can be brought about.

Fundamentally, easy handleability can be made possible by the presence of a gaseous insulating medium, for instance on introduction into the insulation space, on maintenance in the insulation space and optionally in the case of replacement.

Finally, the amount of insulating medium present in the insulation space can be adapted in a simple manner, especially in the case of a gaseous insulating medium, by establishment of a simple superatmospheric pressure in the insulation space and the insulating capability can thus be tailored to the desired field of application.

In addition, it is provided in the case of the insulating medium described here that this medium comprises at least the following constituents:

synthetic air in a proportion of from ≥50% by volume to ≤98% by volume, for instance from ≥85% by volume to ≤98% by volume; and an organic fluorine compound in a proportion of from ≥2% by volume to ≤50% by volume, for instance from ≥2% by volume to ≤15% by volume.

For example, the insulating medium can consist of the abovementioned constituents in the abovementioned proportions, taking into account any contamination of or impurities in the substances.

In particular, this configuration of the insulating medium can make effective extinguishing of an electric arc possible and also allow stable operation over the long term even in the case of a plurality of switching operations of the high-voltage switch, or make effective insulation of a conductor in an outer wall of a tube conductor possible.

In detail, the above-described insulating medium can make it possible for no electrically conductive soot to be formed from the insulating medium itself as a result of decomposition in the electric arc. This can be advantageous, since soot can influence the insulation capability. This advantageous effect can be explained by the presence of oxygen which "scavenges" the precipitation of soot, for example by formation of CO or $CO_2$. The long-term stability of the contact elements and thus a high-voltage switch can be significantly improved thereby.

The latter can also be increased by the insulating medium itself also not being decomposed in the case of an electric arc, but instead remaining stable. In this way, too, the occurrence of soot-containing compounds can be reduced. Furthermore, the insulating power of the insulating medium can be maintained, which can further improve long-term stable operation.

Furthermore, insulating media which comprise synthetic air and one or more fluoroorganic components in the above-described amounts can make it possible to achieve improved long-term impermeability of switching devices or in tube conductors. This can be due, in particular, to the insulating medium having a comparatively low permeation rate in respect of customary polymers which are usually employed as sealing materials. In particular, oxygen and nitrogen have a low permeation rate through customary polymers. Illustrative polymers as sealing materials encompass, for example, EPDM (ethylene-propylene-diene rubber), NBR (nitrile-butadiene rubber), CR (chloroprene rubber), IIR (isobutene-isoprene rubber), SBR (styrene-butadiene rubber) or FKM (fluoropolymer rubber). This can result in the insulation medium remaining reliable and stable over the long term in the insulation space even under superatmospheric pressure, without complicated sealing materials or sealing arrangements having to be used.

This also makes it possible for the insulation space to be able to be operated at a superatmospheric pressure even with a simple structure of the insulation space. As a result, the insulating power can be made particularly effective with a simple structure.

The presence of at least one fluoroorganic compound, i.e. one or more fluoroorganic compounds, can also make it possible for the dielectric strength of the insulating medium to be improved. As a result, the effectiveness of the extinguishing of an electric arc or the effectiveness of an insulation can be particularly high, in particular compared to pure synthetic air.

It can here be sufficient for the fluoroorganic compound to be present in a range of from ≥2% by volume to ≤50% by volume in the insulation medium. These amounts can be based on the filling pressure of the insulation space, which can be from ≥4 bar to ≤10 bar, for instance from ≥6 bar to ≤8 bar, where the above pressure values are absolute values.

The use of synthetic air can also be particularly preferred since it can be produced simply and inexpensively, for instance by the air surrounding the high-voltage switch being freed of the undesirable constituents using suitable filters, water separators and the like. This can be a great advantage in, for instance, the construction, the operation and the servicing of the electric energy transmission device. As an alternative, synthetic air can be produced in a simple way by mixing nitrogen and oxygen of suitable purity in a suitable mixing ratio.

The above-described advantages can be particularly effective, especially compared to the solutions from the prior art.

It is known, for example, that insulating media based on $CO_2$ and on fluoroorganic substances sometimes have a limited life because such insulating media can decompose under the action of an electric arc. This can reduce the quality of insulation after switching operations. In contrast, the above-described insulating medium has improved stability in respect of decomposition, which improves the long-term stability.

As regards insulating media based on fluoroorganic compounds and $CO_2$ or $N_2$, these tend to form soot during switching operations, which can adversely affect the life of switching devices. However, this adverse effect can be prevented by means of the above-described insulating medium.

It can be particularly preferred for the synthetic air, which can also be referred to as "clean air", to have the following constituents:

nitrogen in a proportion of from ≥70% by volume to ≤99% by volume; and oxygen in a proportion of from ≥1% by volume to ≤30% by volume.

In particular, the synthetic air can consist of the above-described constituents, i.e. not comprise any further constituents. For example, the synthetic air can consist of 79.5% by volume of oxygen and 20.5% by volume of nitrogen, with impurities of preferably ≤1% by volume, for example ≤5 ppm by volume.

In this embodiment, it can particularly effectively be made possible for the stability of the insulating medium itself to be improved and also for soot formation to be prevented. Furthermore, particularly good electric insulation can be made possible.

Preference can also be given to the at least one fluoroorganic compound being selected from the group consisting of fluoronitriles, for instance perfluoronitriles, fluoro ethers, for instance hydrofluoro monoethers, fluoroolefins, for instance hydrofluoroolefins, and fluoroketones, for instance perfluoroketones.

Preferred fluoroorganic compounds can comprise hydrofluoro monoethers having at least three carbon atoms, fluoroketones having a number of from 4 to 12 carbon atoms, for example 5 or 6 carbon atoms.

The fluoroorganic compound can also preferably comprise a perfluoroalkylnitrile, for instance a compound selected from among perfluoroacetonitrile, perfluoropropionitrile ($C_2F_5CN$), perfluorobutyronitrile ($C_3F_2CN$), perfluoroisobutyronitrile ($(CF_3)_2CFCN$), perfluoro-2-methoxypropanenitrile ($CF_3CF(OCF_3)CN$), or mixtures thereof, as are described, for example, in WO2015/071303 A1.

It has been found that the dielectric strength or the quality of insulation can be particularly high when using such fluoroorganic compounds. As a result, the extinguishing of an electric arc can be particularly effective or an effective electrical insulation can be made possible.

It can also be provided for the insulating medium to be essentially free of at least one of water, carbon dioxide and sulfur hexafluoride. For example, the insulating medium can be essentially free of water, carbon dioxide and sulfur hexafluoride. For the purposes of the present invention, "essentially free" means, in particular, that the abovementioned materials can be present in a proportion of ≤1% by volume, for example ≤10 ppm by volume, for instance ≤5 ppm by volume, in the insulating medium.

In this embodiment, the formation of soot-containing degradation products, which can have an adverse effect on the insulating capability of switching units, in the presence of an electric arc can be particularly effectively prevented. Thus, in this embodiment in particular, the long-term stability of a switching unit can be particularly high and effective electric insulation can also be made possible.

In order for these advantages to be particularly effective, preference can be given to the insulating medium consisting of synthetic air and at least one fluoroorganic compound. Thus, essentially no further substances apart from synthetic air, i.e. oxygen and nitrogen, and at least one fluoroorganic compound are present in the insulating medium. For the purposes of the present invention, "essentially" once again means, in particular, that further materials apart from the abovementioned materials should only be present in a proportion of ≤1% by volume, for example ≤10 ppm by volume, for instance ≤5 ppm by volume, in the insulating medium.

It is not ruled out for the purposes of the present invention that the insulating medium comprises further constituents such as nitrogen oxides or carbon dioxide.

As regards further technical features and advantages of the insulating medium, reference will be made to the information given in respect of the use and the electric energy transmission device and also to the figures and the description of the figures, and vice versa.

The present invention further provides for the use of an insulating medium as is described in detail above as electric arc extinguishing medium in a high-voltage switch or as electrically insulating atmosphere in a fluid-insulated tube conductor.

The use of the insulating medium which has been defined in detail above makes it possible to combine effective extinguishing of an electric arc with stable operation of the high-voltage switch over the long term. Furthermore, a particularly good insulating quality of the insulating atmosphere can be made possible.

As regards further technical features and advantages of the invention, reference is made to the information given in respect of the insulating medium and the electric energy transmission device and also to the figures and the description of the figures, and vice versa.

The present invention further provides a fluid-insulated electric energy transmission device having an insulation space which is closed off in a fluid-tight manner, where an insulating medium is arranged in the insulation space or in a reservoir which can be connected to the insulation space, characterized in that the insulating medium is configured as described in detail above.

For the purposes of the present invention, an electric energy transmission device can in principle be any device in which energy, in particular in the form of electric power, can be transmitted.

It can be particularly preferred in the context of the invention for the electric energy transmission device to comprise at least one of a high-voltage switch and a fluid-insulated tube conductor.

Here, a high-voltage switch or a fluid-insulated tube conductor is, in particular, configured as described in detail above.

Accordingly, it can be advantageous in the case of a tube conductor for a high insulation quality of a conductor arranged in an outer wall and surrounded by an insulating atmosphere to be made possible. Thus, the space in the tube conductor which surrounds the conductor and is surrounded by an outer wall is the insulation space in which the insulating medium is preferably permanently present in a tube conductor.

In the case of the high-voltage switch, it can be particularly advantageous that reliable extinguishing of an electric arc is made possible, with improved longevity also being able to be achieved.

In a manner known per se, the high-voltage switch comprises an insulation space which is also referred to as fluid accommodation space. A first switching unit, which can, in particular, be configured as grounding switch or as parting switch or as grounding switch and parting switch, is arranged in this insulation space. When contact elements of the first switching unit are parted, this can result in formation of an electric arc which is thus caused by the first switching unit and should also be extinguished.

For this purpose, an insulating medium is provided in the insulation space itself, i.e. preferably permanently and independently of switching operations taking place, or else in a reservoir which can be connected to the insulation space, for instance in the case of a switching operation of the above type. The insulating medium can extinguish the electric arc fundamentally but particularly advantageously in a switch design appropriate for this purpose, for instance arrangement of the switching unit, speed of the movable contacts, etc., due to its properties and thus ensure reliable operation of the high-voltage switch.

As a result of an insulating medium as described above being used, degradation of the insulating medium itself can be prevented or at least significantly reduced. Fundamentally, a significantly improved long-term stability can be made possible by, for instance, soot formation being reduced.

In the case of a high-voltage switch, it can particularly preferably be provided for a second switching unit and optionally a third switching unit to be arranged in addition to the first switching unit in the insulation space, with the first switching unit and the third switching unit each having at least one of a parting switch and a grounding switch and with the second switching unit having a power switch, in particular a vacuum switch. In this embodiment, a grounding switch, a parting switch and a power switch, in particular a vacuum switch, are provided, with the grounding switch and the parting switch being able to be separate from one another or being able to be configured as a single switching unit.

The power switch, in particular a vacuum switch, can be actuated independently of parting and grounding switches, for instance when malfunctions, for example short circuits in the power network, occur and high short circuit currents have to be interrupted.

Parting and grounding switches are, in particular, safety-relevant switching devices and are actuated comparatively rarely, for instance when maintenance work is to be carried out or a change between collecting rails takes place. Switching of a parting and grounding switch is usually preceded by switching of the power switch.

In other words, a parting switch and a grounding switch which are preferably both surrounded by the insulating medium are present in the insulation space in this embodiment. Furthermore, a vacuum switch is provided in the insulation space, with the contact elements of the vacuum switch not being in contact with the insulating medium but instead being present in a vacuum atmosphere. The insulation space can be separated into a plurality of regions, for example by means of fluid-impermeable, for instance gastight, or fluid-permeable, for instance gas-permeable, partitions, with the individual regions of the insulation space being in their entirety or only partly, but in particular the region of the insulation space surrounding the first switching unit and optionally the region of the insulation space surrounding the third switching unit, being filled with the insulating medium.

Here, the power switch can, in particular, be a vacuum power switch or serve to interrupt high currents, in particular short circuit currents, while the parting switch and the grounding switch serve to interrupt small currents, in particular commutation currents, charging currents and induced currents, with the insulating medium serving as electric arc extinguishing medium for parting and grounding switches.

The power switch, for instance the vacuum switch, can interrupt currents in the range from 25 000 A to 80 000 A or voltages in the range from 72 500 V to 800 000 V can be present at the switch.

A parting switch can also interrupt currents in the range from 0.1 A to 8000 A or voltages in the range from 10 V to 1000 V can be present at this switch.

Furthermore, a grounding switch can interrupt currents in the range from 0.4 A to 500 A or voltages in the range from 500 V to 70 000 V can be present at this switch.

The above-described values are not to be interpreted as definitive restrictions.

An increase in the life of the switching devices can be achieved particularly effectively by use of a vacuum power switch, with, in particular, burning-resistant materials such as tungsten-copper or copper-chromium alloys being able to be used. In addition, no or only few molecules which would lead to burning-away of the contact elements and also could decompose are present because of the vacuum. In other words, the absence of gas molecules results in no gas aging being able to take place. The long-term stability can be improved further thereby.

Furthermore, the long-term stability can be improved further by use of the above-described insulating medium, in particular in the case of grounding switches or parting switches, since the formation of soot-containing decomposition products can be prevented in, for example, grounding switches or parting switches.

In particular, the use of the above-described insulating medium in combination with a vacuum switch as preferred power switch can thus be an optimum solution for switching devices having a long life, which is particularly important for use in high-voltage technology.

As regards the vacuum switch, it can be advantageous for a pressure in the range from $10^{-10}$ bar to $10^{-6}$ bar to be present in a switching space of the vacuum switch or of the second switching unit.

Furthermore, it can be particularly preferred in respect of the insulation space for the insulating medium to be present with a pressure in the range from $\geq 4$ bar (absolute) to $\leq 10$ bar (absolute) in the insulation space.

As regards further technical features and advantages of the electric energy transmission device, reference is made to the information given in respect of the insulating medium and the use and also to the figures and the description of the figures, and vice versa.

Further details, features and advantages of the subject matter of the invention can be derived from the dependent claims and also from the following description of the FIGURE and the associated example.

BRIEF DESCRIPTION OF THE SINGLE VIEW OF THE DRAWING

The FIGURE schematically shows an embodiment of a high-voltage switch as electric energy transmission device according to the present invention.

DETAILED DESCRIPTION OF THE INVENTION

A schematic example of an embodiment of an electric energy transmission device in the form of a high-voltage switch 10 according to the invention is shown in the FIGURE.

The high-voltage switch 10 comprises an insulation space 12 which is closed in a gastight manner and in which an insulating medium 13, as is described in detail below, is arranged.

It is also shown that a first arrangement 14 of first switching units 16 is arranged in the insulation space 12. Furthermore, a second arrangement 18 of first switching units 16 is arranged in the insulation space 12. The first switching unit 16 is here configured as a combined grounding switch and parting switch. Thus, the first arrangement 14 and the second arrangement 18 each have switching units 16 with grounding and parting switches.

A second switching unit 20 is likewise arranged in the insulation space 12. The second switching unit 20 comprises a power switch and is preferably configured as vacuum switch. The vacuum switch has a switching space with a partible contact, and an illustrative pressure of less than or equal to $10^{-6}$ bar is present in the switching space. It is shown here that the insulation space 12 is separated into a plurality of regions 15 by gastight or gas-permeable partitions 11, with all regions 15 of the insulation space 12 being filled with the insulating medium 13 in this embodiment.

As an alternative to this embodiment, the first switching unit 16 could represent only a grounding switch and a third switching unit comprising the parting switches would accordingly be provided. The third switching unit could then be a constituent of the first arrangement 14 and of the second arrangement 18, or of further arrangements which are not shown.

Also shown is a control box 22 by means of which the high-voltage switch 10 can be controlled and is located on a console 24.

To operate the vacuum switch as second switching unit 20, a spring storage drive 26 having a power switch control drive is also provided. Also shown are a voltage transformer 28 and a rapid grounder 30. Finally, the FIGURE also shows an output building block 32 with further parting and grounding switches and also a cable end fastener 34.

Coming back to the insulation space 12 and the insulating medium 13 arranged therein, this medium is present under a superatmospheric pressure, with the superatmospheric pressure being able to be, for example, in a range from ≥4 bar to ≤10 bar. The total insulation space 12 is thus also gastight at an appropriate superatmospheric pressure.

Furthermore, the insulation medium 13 has the following constituents:
synthetic air in a proportion of from ≥50% by volume to ≤98% by volume; and
an organic fluorine compound in a proportion of from ≥2% by volume to ≤50% by volume, where the fluorine compound can comprise, for example, fluoronitriles, for instance perfluoronitriles, fluoro ethers, for instance hydrofluoro monoethers, fluoroolefins, for instance hydrofluoroolefins, and fluoroketones, for instance perfluoroketones.

For example, the insulating medium 13 can consist of synthetic air and the at least one fluoroorganic compound, so that the insulating medium 13 is essentially free of at least one of water, carbon dioxide and sulfur hexafluoride.

Furthermore, the synthetic air can, for example, have the following constituents:
nitrogen in a proportion of from ≥70% by volume to ≤90% by volume; and
oxygen in a proportion of from ≥10% by volume to ≤30% by volume.

The individual combinations of the constituents and the features of embodiments mentioned above are illustrative; replacement and substitution of these teachings with other teachings given in this document are likewise expressly taken into consideration together with the documents cited. A person skilled in the art will know that variations, modifications and other embodiments which are described here can likewise occur without going outside the inventive concept and the scope of the invention.

Accordingly, the abovementioned description is to be interpreted as illustrative rather than limiting. The word "comprise" used in the claims does not rule out other constituents or steps. The indefinite article "a(n)" does not rule out a plural meaning. The simple fact that particular measures are recited in mutually different claims does not mean that a combination of these measures cannot be utilized advantageously. The scope of the invention is defined in the following claims and the associated equivalents.

The invention claimed is:

1. An insulating medium for an electric energy transmission device, the insulating medium comprising:
synthetic air comprising ≥70% to ≤99% by volume of the synthetic air of nitrogen and 1% to 30% by volume of the synthetic air of oxygen in an amount of from ≥50% to ≤98% by volume of the insulating medium; and
at least one fluoroorgano compound in a total amount of from ≥2% to ≤50% by volume of the insulating medium,
wherein the insulating medium for the electric energy transmission device being is a fluid at room temperature and atmospheric pressure.

2. The insulating medium according to claim 1, wherein the insulating medium is substantially free of at least one of water, carbon dioxide, and sulfur hexafluoride.

3. The insulating medium according to claim 1, wherein the at least one fluoroorganic compound is selected from a group consisting of fluoronitriles, fluoroethers, fluoroolefins, fluoroketones, and perfluoroalkylnitriles.

4. The insulating medium according to claim 1, where the synthetic air comprises an amount of from ≥85% to ≤98% by volume of the insulating medium and at least one fluoroorgano compound in a total amount of from ≥2% to ≤15% by volume of the insulating medium.

5. The insulating medium according to claim 4, where the synthetic air comprises an amount of 95% by volume of the insulating medium and at least one fluoroorgano compound in a total amount of from 5% by volume of the insulating medium.

6. An electric arc extinguishing medium for a high-voltage switch, the electric arc extinguishing medium comprising:
synthetic air comprising ≥70% to ≤99% by volume of the synthetic air of nitrogen and 1% to 30% by volume of the synthetic air of oxygen in a total amount of from ≥50% to ≤98% by volume of the electric arc extinguishing medium; and
at least one fluoroorgano compound in a total amount of from ≥2% to ≤50% by volume of the electric arc extinguishing medium,
wherein the electric arc extinguishing medium for the high-voltage switch is a fluid at room temperature and atmospheric pressure.

7. A fluid-insulated electric energy transmission device, comprising:
an insulation space closed in a fluid-tight manner; and
an insulating medium disposed in said insulation space or in a reservoir to be connected to said insulation space,
wherein said insulating medium is a fluid at room temperature and atmospheric pressure, and said insulating medium comprises:
synthetic air comprising ≥70% to ≤99% by volume of the synthetic air of nitrogen and 1% to 30% by volume of the synthetic air of oxygen in an amount of from ≥50% to ≤98% by volume of the insulating medium, and
at least one fluoroorgano compound in a total amount of from ≥2% to ≤50% by volume of the insulating medium.

8. The fluid-insulated electric energy transmission device according to claim 7, wherein the fluid-insulated electric energy transmission device is at least one of a high-voltage switch and a fluid-insulated tube conductor.

9. The fluid-insulated electric energy transmission device according to claim 7, wherein:
the fluid-insulated electric energy transmission device is a high-voltage switch;
a first switching unit, a second switching unit and a third switching unit are disposed in said insulation space of the high-voltage switch;
said first switching unit and said third switching unit each have at least one of a parting switch or a grounding switch; and
said second switching unit is a power switch.

10. The fluid-insulated electric energy transmission device according to claim 9, wherein said power switch is a vacuum switch.

\* \* \* \* \*